United States Patent [19]

Thiel et al.

[11] Patent Number: 4,805,091
[45] Date of Patent: Feb. 14, 1989

[54] METHOD AND APPARATUS FOR INTERCONNECTING PROCESSORS IN A HYPER-DIMENSIONAL ARRAY

[75] Inventors: Tamiko Thiel, Somerville; Richard Clayton, Stow; Carl Feyman; W. D. Hillis, both of Cambridge; Brewster Kahle, Boston, all of Mass.

[73] Assignee: Thinking Machines Corporation, Cambridge, Mass.

[21] Appl. No.: 740,943

[22] Filed: Jun. 4, 1985

[51] Int. Cl.$^4$ .................. G06F 15/16; G06F 1/00
[52] U.S. Cl. .................................................. 364/200
[58] Field of Search ... 364/200 MS File, 900 MS File, 364/300 MS File; 370/60, 94

[56] References Cited

U.S. PATENT DOCUMENTS

| | | | |
|---|---|---|---|
| 4,247,892 | 1/1981 | Lawrence | 364/200 |
| 4,523,273 | 6/1985 | Adams, III et al. | 364/200 |
| 4,550,397 | 10/1985 | Turner et al. | 370/60 |
| 4,598,400 | 7/1986 | Hillis | 370/60 |
| 4,620,286 | 10/1986 | Smith et al. | 364/900 |
| 4,621,339 | 11/1986 | Wagner et al. | 364/900 |
| 4,633,431 | 12/1986 | Buckenhof | 364/900 |
| 4,644,496 | 2/1987 | Andrews | 364/900 |
| 4,709,327 | 11/1987 | Hillis et al. | 364/200 |

OTHER PUBLICATIONS

Hillis, "The convection Machine", 1985, MIT Press.
Electronics Week, "Supercube", 2/11/85, pp. 15–17.
Pease, "The Indirect Binary m-Cube Microprocessor Array", 1977, IEEE TOC, vol. C-26, No. 5, pp. 250–265.
Adams et al., "The Extra Stage Cube", 1982, IEEE TOC, vol. C-31, No. 5, pp. 443–454.
IEEE Micro, 10/86, pp. 6–17, Esp. p. 7, Describing Squire et al. 1962.
System Design/Computers, 9/1/85, Asbury et al., pp 99–107.
"Concurrent Computers Make Scientific Computing Affordable", Computer Design, vol. 24, No. 4, pp. 59–60 (Apr. 1985).
Charles L. Seitz, "The Cosmic Cube," *Comm. of the ACM*, vol. 28, No. 1, pp. 22–33, Jan. 1985.

Primary Examiner—Gary V. Harkcom
Assistant Examiner—Christopher H. Lynt
Attorney, Agent, or Firm—Pennie & Edmonds

[57] ABSTRACT

A massively parallel processor comprising 65,534 ($=2^{16}$) individual processors is organized so that there are 16 ($=2^4$) individual processors on each of 4,096 ($=2^{12}$) integrated circuits. The integrated circuits are interconnected in the form of a Boolean cube of 12 dimensions for routing of message packets. Each circuit board carries 32 ($=2^5$) integrated circuits and each backplane carries 16 ($=2^4$) circuit boards. There are eight ($=2^3$) backplanes advantageously arranged in a cube that is 2×2×2. Each integrated circuit on a circuit board is connected to five integrated circuits on the same board which are its nearest neighbors in the first five dimensions. Further, each integrated circuit is also connected to four other integrated circuits on different circuit boards, but on the same backplane. Finally, each integrated circuit is also connected to three other integrated circuits, each on a different backplane. As a result of this arrangement, all message packets are first routed to nearest neighbor ICs located on the same circuit board; all message packets are then routed to nearest neighbor ICs located on the same backplane; and finally, all message packets are then routed to nearest neighbor ICs located on different backplanes.

18 Claims, 5 Drawing Sheets

METHOD AND APPARATUS FOR INTERCONNECTING PROCESSORS IN A HYPER-DIMENSIONAL ARRAY

CROSS-REFERENCE TO RELATED APPLICATIONS

Related applications are "Parallel Processor", Ser. No. 499,474, filed May 31, 1983 and its divisional application, "Parallel Processor", Ser. No. 671,835, filed Nov. 15, 1984, now U.S. Pat. No. 4,598,400 of W. Daniel Hillis, which are incorporated herein by reference.

BACKGROUND OF THE INVENTION

This relates to a massively parallel processor having a large number of interconnected processors operating in parallel and, in particular, to one in which such processors are interconnected in a hyper-dimensional pattern (i.e., a pattern of more than three dimensions). Advantageously, the processors are connected in a Boolean n-cube where n is relatively large (e.g. $n \geq 10$).

As described in connection with FIG. 1A of the above-reference applications, an array 30 of parallel processing integrated circuits (ICs) 35, illustratively, contains 32,768 ($=2^{15}$) identical ICs 35; and each IC 35 contains 32 ($=2^5$) identical processor/memories 36. Thus the entire array 30 contains 1,048,576 ($=2^{20}$) identical processor/memories 36. Processor/memories 36 are organized and interconnected in two geometries. The first is a conventional two-dimensional grid pattern in which the processor/memories are organized in a square array and connected to their four nearest neighbors in the array. The second is a Boolean n-cube of fifteen dimensions.

The present invention is related to the realization of the second of these interconnection geometries in the three-dimensional world of integrated circuits, circuit boards and backplanes (or mother boards) in which it must be built.

To understand the n-cube connection pattern for ICs 35, it is helpful to number the ICs from 0 to 32,767 and to express these numbers or addresses in binary notation using fifteen binary digits as in Table I.

TABLE I

| IC address in decimal notation | IC address in binary notation | | | | |
|---|---|---|---|---|---|
| 0 | 000 | 000 | 000 | 000 | 000 |
| 1 | 000 | 000 | 000 | 000 | 001 |
| 2 | 000 | 000 | 000 | 000 | 010 |
| 3 | 000 | 000 | 000 | 000 | 011 |
| 4 | 000 | 000 | 000 | 000 | 100 |
| . | . | . | . | . | . |
| . | . | . | . | . | . |
| . | . | . | . | . | . |
| 32765 | 111 | 111 | 111 | 111 | 101 |
| 32766 | 111 | 111 | 111 | 111 | 110 |
| 32,767 | 111 | 111 | 111 | 111 | 111 |

Just as we can specify the position of an object in a two dimensional grid by using two numbers, one of which specifies its position in the first dimension of the two-dimensional grid and the other which specifies its position in the second dimension, so too wee can use a number to identify the position of an IC in each of the fifteen dimensions of the Boolean 15-cube. In an n-cube, however, an IC can have one of only two different positions, 0 and 1, in each dimension. Thus, the fifteen-digit IC address in binary notation as set forth in Table I also specifies the IC's position in the fifteen dimensions of the n-cube. For convenience, we will use the left-hand-most digit of the fifteen binary digits to specify the IC's position in the first dimension, and so on in order to the right-hand-most digit which specifies the IC's position in the fifteenth dimension.

Moreover, because a binary digit can have only two values, zero or one, and because each IC is identified uniquely by fifteen binary digits, each IC has fifteen other ICs whose binary address differs by only one digit from its own address. We will refer to these fifteen ICs whose address differs by only one from that of a first IC as the first IC's nearest neighbors. Those familiar with the mathematical definition of a Hamming distance will recognize that the first IC is separated from each of its fifteen nearest neighbors by the Hamming distance one. Two examples of the addresses of an IC and its fifteen nearest neighbors are set forth in Table II of the above referenced applications. With reference to Table I of the present application, the ICs whose decimal address are 1, 2 and 4 are some of the nearest neighbors of the IC whose decimal address is 0.

To connect ICs 35 of the above-referenced applications in the form of a Boolean 15-cube, each IC is connected to its fifteen nearest neighbors by 15 input lines 38 and fifteen output lines 39. Each of these fifteen input lines 38 to each IC 35 is associated with a different one of the fifteen dimensions of the Boolean 15-cube and likewise each of the fifteen output lines 39 from each IC 35 is associated with a different dimension.

To permit communication through the interconnection pattern of the Boolean 15-cube, the results of computations are organized in the form of message packets; and these packets are routed from one IC to the next by routing circuitry in each IC in accordance with address information that is part of the packet. An illustrative format of the message packet is depicted in FIG. 4 of the above-identified applications where it is seen to comprise fifteen bits of IC address, a format bit, another fifteen bits duplicating the IC address, five bits of address to the processor/memory in the IC, four bits of address to a register in the processor/memory, thirty-two bits of a message and one bit for error detection. Alternatively, a message packet can be used that employs only one set of fifteen bits for an IC address.

In the message packet, the IC address information is relative to the address of the destination IC. Initially, it is the difference or the displacement between the address of the IC that is the source of the message and that of its destination. For example, if the address of the source IC is 010 101 010 101 010 and the address of the destination IC is 111 111 111 111 111, then the relative address that is generated at the source IC is 101 010 101 010 101. It will be apparent that 1-bits in the relative address identify the dimensions where the message packet is not in the correct position and therefore identify the dimensions through which the message packet must be moved to reach the destination IC. Thus, in the above example, where the addresses of the source and destination ICs are the same in each of the even-numbered dimensions, the message is already located in the proper position in those dimensions. However, in the odd dimensions where the addresses of the source and the destination ICs are different, the presence of 1-bits in the relative address for those dimensions indicates that it is necessary to move the message packet from one IC to another in that dimension.

As the message is routed from one IC to the next, the relative address is updated to take into account each move. In the case where the message packet includes a duplicate IC address, this is conveniently done by complementing the bits in the duplicate IC address that are associated with the dimensions through which the message packet is moved. As a result, when the message packet arrives at the destination IC, the bits in the duplicate IC address will be all zeros.

The routing circuitry in all the ICs is identical and operates in synchronism using the same routing cycle. In the first time period of each routing cycle, the routing circuitry at each IC in the Boolean n-cube tests the leading bit of the first copy of the IC address of each message packet in the routing circuitry to determine its level. If there is a 1-bit in this position and if the output line from that IC which is associated with the first dimension is not already busy, the message packet is routed down the first dimension output line to the IC's nearest neighbor in the first dimension. If the leading bit of the message packet address is a 0-bit, the message packet remains in the same IC because it is in the correct position in the first dimension.

The leading bit of the first copy of the IC address in the message packet is then discarded. If the message packet was routed to another IC, the corresponding address bit in the duplicate IC address is complemented in order to account for such move.

In the second address time period, the routing circuitry of each IC tests the second bit of the relative address which indicates whether the message packet is in the proper position in the second dimension. If the bit is a 1-bit and if the second dimension output line is not already busy, the message packet is then routed out on the second dimension output line to that IC's nearest neighbor in the second dimension. If the bit is a 0-bit, the message packet remains in the IC.

This process continues through fifteen address time periods, at the end of which each of the fifteen address bits of the message packet will have been tested; and if the needed output lines were available, a path will have been established through the Boolean 15-cube through which the remainder of the message packet can be transmitted.

In the case where the message packet contains only a single fifteen-bit IC address, the process is the same, but the bits of the IC address are not discarded after use in routing selection. Rather, the bit associated with each dimension is complemented if the message packet was routed to another IC in that dimension and the entire address, as complemented, is retained. Again, when all fifteen bits of address are zero, the message packet has reached its destination.

SUMMARY OF THE INVENTION

In accordance with one form of the invention, the nearest neighbors of each integrated circuit chip are located on circuit boards and backplanes (or mother boards) so that:

1. all message packets are first routed to nearest neighbor ICs located on the same circuit board;
2. all message packets are then routed to nearest neighbor ICs located on the same backplane; and
3. all message packets are then routed to nearest neighbor ICs located on different backplanes.

This is accomplished by interconnecting the ICs on the circuit boards and backplanes so that on each circuit board the ICs are connected to their nearest neighbor ICs in a first consecutive number of dimensions, on each backplane the ICs on each board are connected to ICs on other boards of the same backplane that are its nearest neighbors in a second consecutive number of dimensions and the ICs on one backplane are connected to those on other backplanes that are its nearest neighbors in a third consecutive number of dimensions.

One such massively parallel system that has been implemented in accordance with the invention comprises 65,534 ($=2^{16}$) individual processors organized so that there are 16 ($=2^4$) individual processors on each of 4,096 ($=2^{12}$) integrated circuits. In this system each circuit board carries 32 ($=2^5$) integrated circuits and each backplane carries 16 ($=2^4$) circuit boards. There are eight ($=2^3$) backplanes advantageously arranged in a cube that is $2\times2\times2$.

In accordance with the invention, each integrated circuit on a circuit board is connected to five integrated circuits on the same board which are its nearest neighbors in the first five dimensions. Further, each integrated circuit is also connected to four other integrated circuits on different circuit boards, but on the same backplane. Finally, each integrated circuit is also connected to three other integrated circuits, each on a different backplane.

As a result of these arrangements, the effects of different path lengths between nearest neighbor ICs can be minimized by altering the time required for different clock cycles during a routing clock. Thus, while message packets are being routed to the nearest neighbors on the same board, relatively short clock cycles can be used commeasurate with the relatively short propagation distances encountered. Longer clock cycles can be used during that portion of the routing cycle in which the message packets are routed over the longer distances between backplanes.

BRIEF DESCRIPTION OF DRAWING

These and other objects, features and advantages of the invention will be more readily apparent from the following detailed description of a preferred embodiment of the invention in which.

DETAILED DESCRIPTION OF PREFERRED EMBODIMENT

Figure 1:
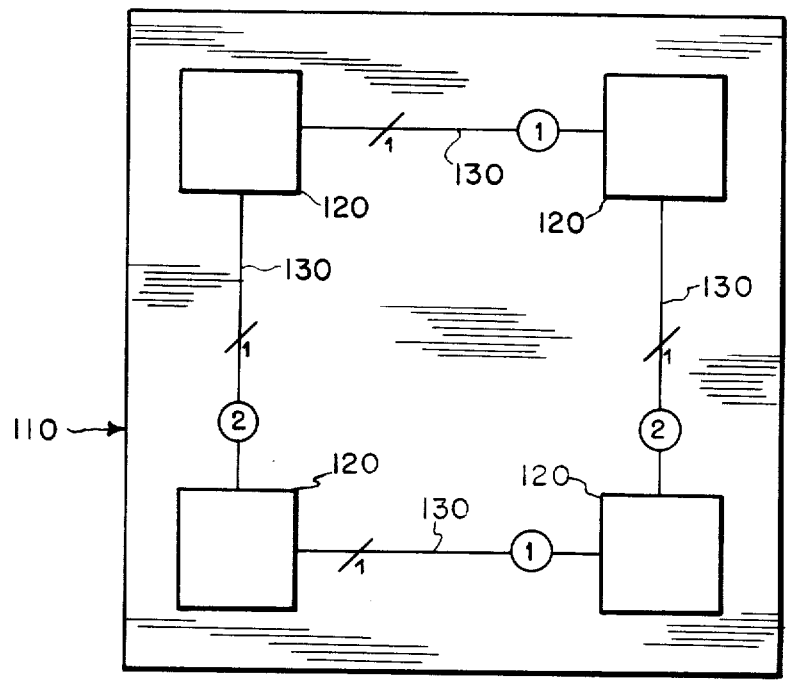
FIG. 1 is a schematic illustration of the interconnection of an IC chip to its nearest neighbors in the first and second dimensions on a circuit board.
Figure 2:
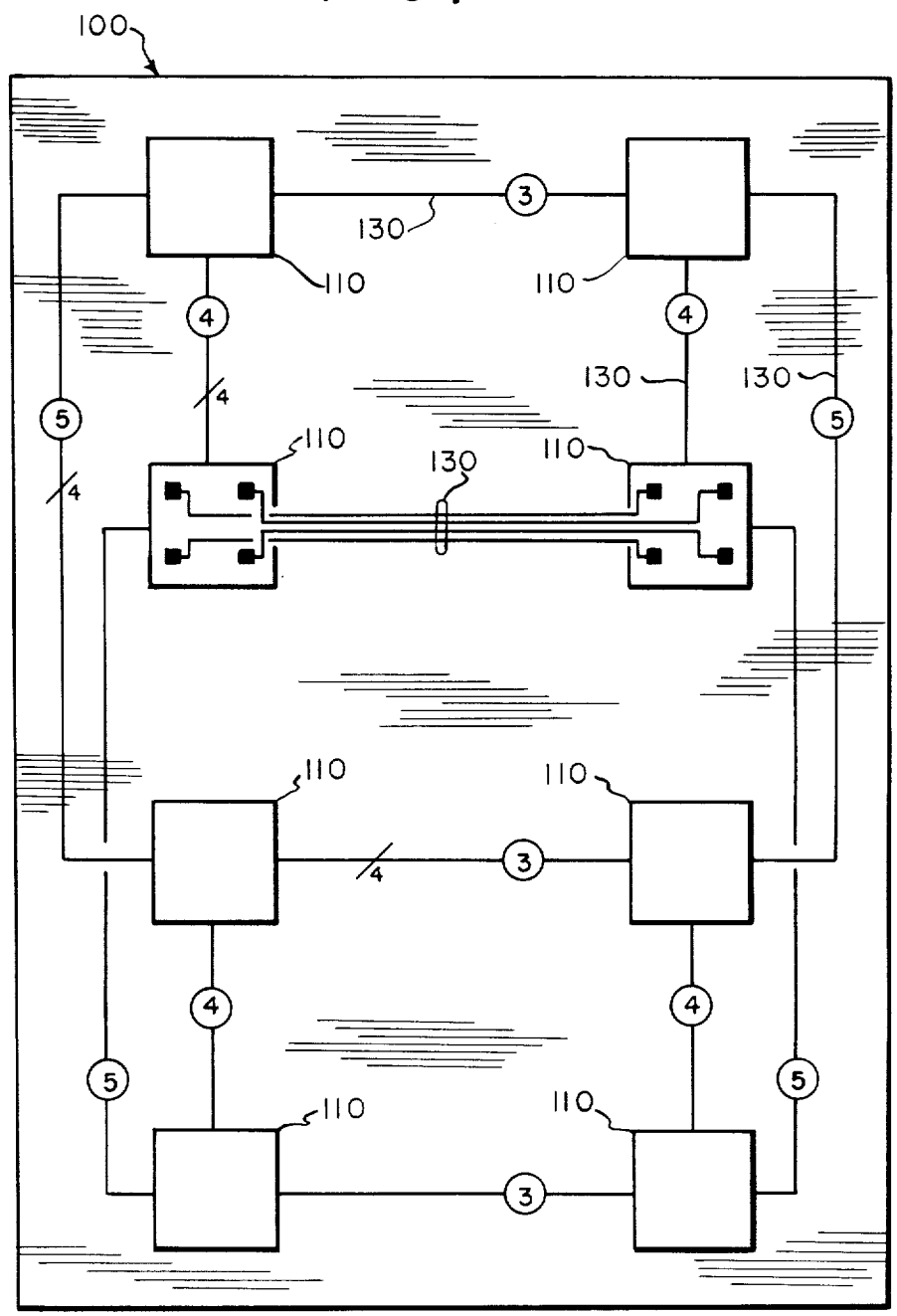
FIG. 2 is a schematic illustration of the interconnection of an IC chip to its nearest neighbors in the third, fourth and fifth dimensions on a circuit board.

FIG. 2 depicts the layout of a circuit board 100 in accordance with the invention. As shown therein, board 100 is divided into eight identical sections 110 and each section contains four integrated circuits 120. Illustratively, each integrated circuit contains sixteen processor/memory circuits. FIG. 1 shows in greater detail one of sections 110 and in particular, depicts the connections in the first and second dimensions between the four integrated circuits 120 of that section. Each integrated circuit is connected by lines 130 to two other integrated circuits which are its nearest neighbors in the first and second dimensions.

For convenience of illustration each line 130 represents one or more input and output lines of each IC chip, circuit board or backplane to which it is connected. The number of such lines is signified by a number following a slash through the line; and the dimension associated with the line is specified within a bubble in the line.

FIG. 2 depicts the connections between the sections. Thus, each section 110 is seen to be connected to three other sections; and as shown in the detailed portion of FIG. 2, each integrated circuit of a section is connected to one integrated circuit in each section to which the section is connected. Thus, each integrated circuit is connected to its nearest neighbors in the third, fourth and fifth dimensions.

Examination of the layout of FIG. 2 will reveal a connection pattern that is the same as the connection pattern that would be observed if each of the eight sections were located at a different vertex of a cube. Thus, the four sections in the upper half of FIG. 2 can be regarded as the four sections in the four corners of the base of a cube; and the four sections in the lower half of FIG. 2 can be regarded as the four sections in the four corners of the top of the cube. As is apparent from FIG. 2, each section in the upper half is connected to its two nearest neighbors in that half; and likewise each section in the lower half is connected to its two nearest neighbors in the lower half. Moreover, each section in the upper half of FIG. 2 is also connected to one section in the lower half and that section is the section that is its nearest neighbor in the top of the cube.

Figure 3:
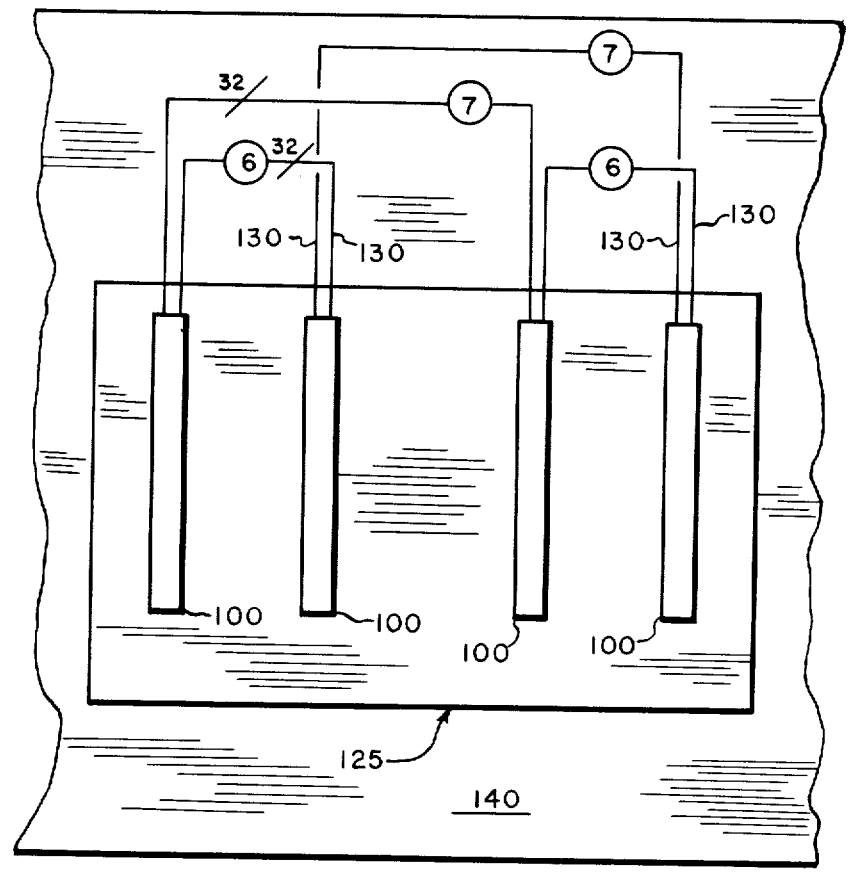
FIG. 3 is a schematic illustration of the interconnection of an IC chip to its nearest neighbors in the sixth and seventh dimensions on a backplane.
Figure 4:
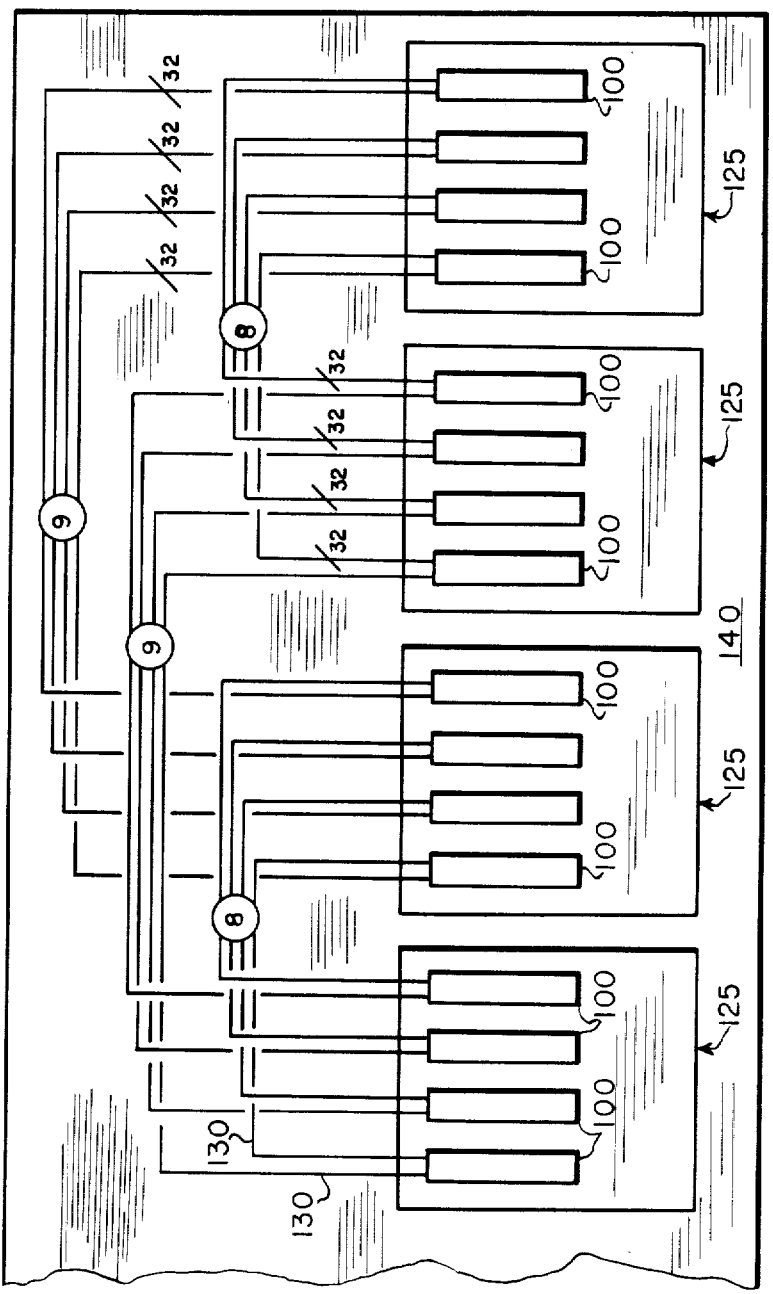
FIG. 4 is a schematic illustration of the interconnection of an IC chip to its nearest neighbors in the eighth and ninth dimensions on a backplane.

The circuit boards are organized in sets and mounted on a backplane 140 shown in FIGS. 3 and 4. Each set comprises four circuit boards 120 which are interconnected by lines 130 so that each board is connected to two of the other three boards in the set. By this means, each IC on a board is connected to one IC on each of two of the other boards, thereby providing connections to three of its nearest neighbors in the sixth and seventh dimensions.

In similar fashion, the boards in each set are connected to boards in two of the other three sets so that each IC on a board is connected to one IC on each of two of the other three sets, thereby providing connections to its nearest neighbors in the eighth and ninth dimensions.

Figure 5:
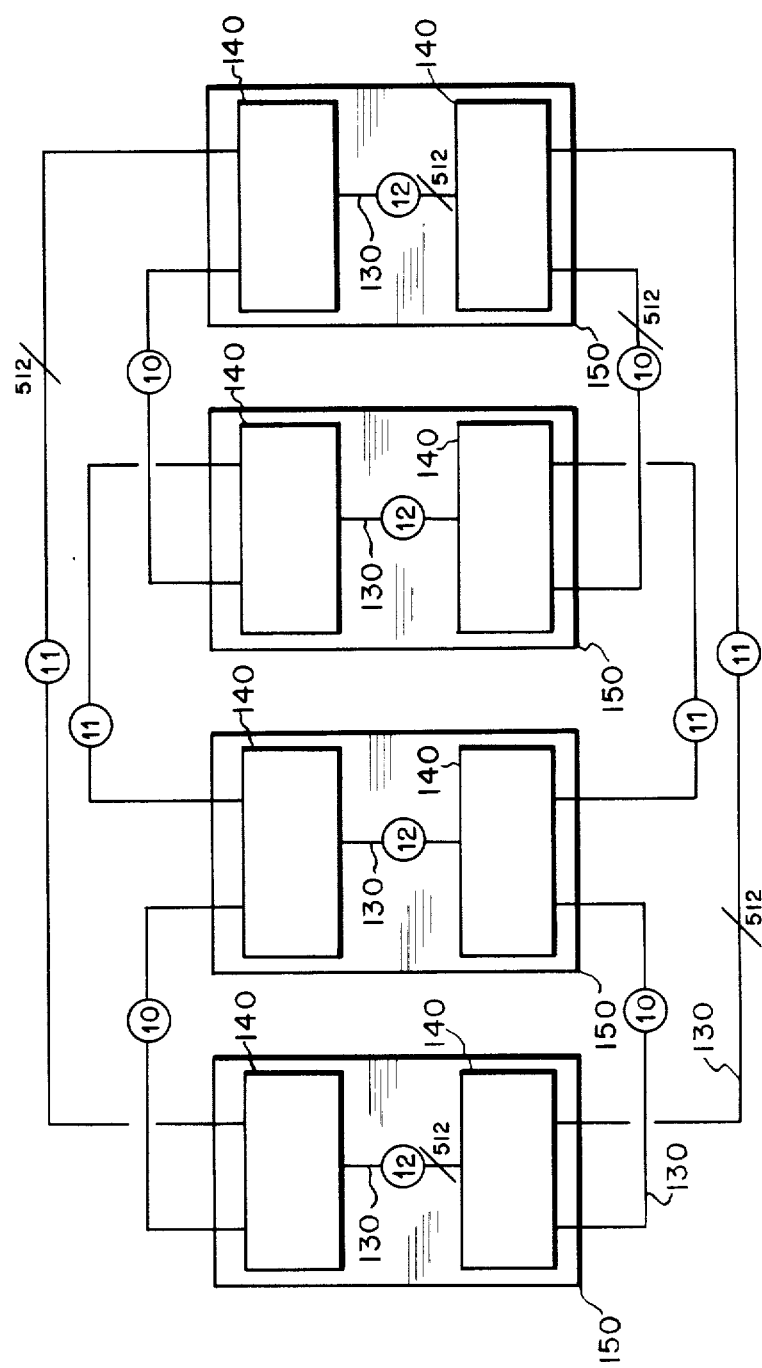
FIG. 5 is a schematic illustration of the interconnection of an IC chip to its nearest neighbors in the tenth, eleventh and twelfth dimensions on different backplanes.

As shown in FIG. 5, the backplanes are mounted in racks 150, with an upper backplane and a lower backplane in each rack. The ICs of each backplane are connected by lines 130 to those in the three nearest backplanes so that each IC in each backplane is connected to an IC in each of three other backplanes, thereby providing connections to its nearest neighbors in the tenth, eleventh and twelfth dimensions.

This connection pattern can be generalized from the foregoing description. The ICs on each circuit board are connected to those ICs which are its nearest neighbors in dimensions 1 through L; the ICs on the boards connected to a backplane are connected to those ICs on other boards on the same backplane which are its nearest neighbors in dimensions L+1 and M; and the ICs on a backplane are connected to those ICs on other backplanes that are its nearest neighbors in dimensions M+1 through N. Even more generally, the ICs on a circuit board are connected to those ICs which are its nearest neighbors in a first consecutive number of dimensions; those on boards connected to the same backplane that are its nearest neighbors in a second consecutive number of dimensions; and those on a backplane are connected to ICs on other backplanes that are its nearest neighbors in a third consecutive number of dimensions.

The foregoing technique can also be extended to other structures. For example, individual processors on a single integrated circuit could also be connected in this same fashion. Thus, if eight processors are located on a chip, each of these processors could be connected through a layout like that of FIG. 2 to its three nearest neighbors in three consecutive dimensions. Most likely such dimensions would be dimensions 1, 2 and 3. And the processors in groups of backplanes can be connected to the processors in other groups of backplanes to connect nearest neighbors in even larger structures than those sketched in FIGS. 1-5. Moreover, while the invention has been described in the context of a Boolean cube in which each IC has one nearest neighbor in each dimension, the invention may also be practiced in other hyper-dimensional structures in which an IC has more than one nearest neighbors in one or more dimensions.

What is claimed is:

1. In a parallel processor having an array of integrated circuits, each of said circuits comprising at least one processor and being interconnected to each of its nearest neighbors in a hyper-dimensional pattern of N dimensions, a method of making such interconnections on a plurality of circuit boards and backplanes comprising the steps of:
    interconnecting on each circuit board the integrated circuits which are nearest neighbors in dimensions one through L;
    interconnecting on each backplane the integrated circuits which are nearest neighbors in dimensions L+1 through M; and
    interconnecting from one backplane to another the integrated circuits which are nearest neighbors in dimensions M+1 through N.

2. The method of claim 1 wherein each integrated circuit contains a plurality of processors.

3. The method of claim 1 wherein the integrated circuits are connected in the form of a Boolean cube of N dimensions.

4. In a parallel processor having an array of integrated circuits, each of said circuits being addressed by a multibit binary address and comprising at least one processor and being interconnected to each of its nearest neighbors in a pattern of a Boolean cube of more than three dimensions, a method of making such interconnections on a plurality of circuit boards and backplanes comprising the steps of:
    interconnecting on each circuit board the integrated circuits which are nearest neighbors in a first consecutive number of dimensions;
    interconnecting on each backplane the integrated circuits which are nearest neighbors in a second consecutive number of dimensions; and
    interconnecting from one backplane to another the integrated circuits which are nearest neighbors in a third consecutive number of dimensions;
    wherein the nearest neighbors of a particular integrated circuit are those other integrated circuits whose addresses differ by the Hamming distance one from that of the particular integrated circuit.

5. The method of claim 4 wherein each integrated circuit contains a plurality of processors.

6. In a parallel processor having an array of integrated circuits, each of said circuits comprising at least one processor and being interconnected to each of its nearest neighbors in a hyper-dimensional pattern of N dimensions, apparatus for interconnecting said integrated circuits on a plurality of boards and backplanes comprising:
   means for interconnecting on each circuit board the integrated circuits which are nearest neighbors in dimensions one through L;
   means for interconnecting on each backplane the integrated circuits which are nearest neighbors in dimensions L+1 through M; and
   means for interconnecting from one backplane to another the integrated circuits which are nearest neighbors in dimensions M+1 through N.

7. The apparatus of claim 6 wherein each integrated circuit contains a plurality of processors.

8. The apparatus of claim 6 wherein the integrated circuits are connected in the form of a Boolean cube of N dimensions.

9. The apparatus of claim 6 wherein the means for interconnecting integrated circuits on a backplane comprises means for interconnecting integrated circuits on each board connected to a backplane to integrated circuits on other boards connected to the same backplane.

10. The apparatus of claim 6 wherein at least eight integrated circuits are mounted on a circuit board with each integrated circuit being connected to an least three nearest neighbors on that board, said eight integrated circuits being arranged in an array of two columns and four rows with each integrated circuit in a top half of the array being connected to two other integrated circuits in the top half and one other integrated circuit in the bottom half.

11. In a parallel processor having an array of integrated circuits, each being addressed by a multibit binary address and comprising at least one processor and being interconnected to each of its nearest neighbors in a pattern of a Boolean cube of more than three dimensions, apparatus for interconnecting said integrated circuits on a plurality of boards and backplanes comprising:
   means for interconnecting on each circuit board the integrated circuits which are nearest neighbors in a first consecutive number of dimensions;
   means for interconnecting on each backplane the integrated circuits which are nearest neighbors in a second consecutive number of dimensions; and
   means for interconnecting from one backplane to another the integrated circuits which are nearest neighbors in a third consecutive number of dimensions;
   wherein the nearest neighbors of a particular integrated circuit are those integrated circuits whose addresses differ by the Hamming distance one from that of the particular integrated circuit.

12. The apparatus of claim 11 wherein each integrated circuit contains a plurality of processors.

13. The apparatus of claim 11 wherein the means for interconnecting integrated circuits on a backplane comprises means for interconnecting integrated circuits on each board connected to a backplane to integrated circuits on other boards connected to the same backplane.

14. The apparatus of claim 11 wherein at least eight integrated circuits are mounted on a circuit board with each integrated circuit being connected to an least three nearest neighbors on that board, said eight integrated circuits being arranged in an array of two columns and four rows with each integrated circuit in a top half of the array being connected to two other integrated circuits in the top half and one other integrated circuit in the bottom half.

15. In a parallel processor having an array of integrated circuits, each of said circuits being addressed by a multibit binary address and comprising at least one processor and being interconnected to each of its nearest neighbors in a pattern of a Boolean cube of more than three dimensions, a method of making such interconnections on a plurality of circuit boards and backplanes comprising the steps of:
   interconnecting on each circuit board the integrated circuits which are nearest neighbors in dimensions one through L;
   interconnecting on each backplane the integrated circuits which are nearest neighbors in dimensions L+1 through M;
   interconnecting from one backplane to another the integrated circuits which are nearest neighbors in dimensions M+1 through N; and
   adjusting the clock cycle of the processor during the routing of messages between processors in accordance with the dimension of the processors between which the message is being routed.

16. The method of claim 14 wherein the nearest neighbors of a particular integrated circuit are those other integrated circuits whose addresses differ by the Hamming distance one from that of the particular integrated circuit.

17. In a parallel processor having an array of integrated circuits, each being addressed by a multibit binary address and comprising at least one processor and being interconnected to each of its nearest neighbors in a pattern of a Boolean cube of more than three dimensions, apparatus for interconnecting said integrated circuits on a plurality of boards and backplanes comprising:
   means for interconnecting on each circuit board the integrated circuits which are nearest neighbors in dimensions one through L;
   means for interconnecting on each backplane the integrated circuits which are nearest neighbors in dimensions L+1 through M;
   means for interconnecting from one backplane to another the integrated circuits which are nearest neighbors in dimensions M+1 through N; and
   means for adjusting the clock cycle during the routing of messages between processors in accordance with the dimension of the processors between which the message is being routed.

18. The apparatus of claim 17 wherein the nearest neighbors of a particular integrated circuit are those integrated circuits whose addresses differ by the Hamming distance one from that of the particular integrated circuit.

* * * * *